March 16, 1954 — J. S. HARDIGG — 2,671,999
POTATO DIGGER AND SEPARATOR
Filed July 20, 1951 — 2 Sheets-Sheet 1
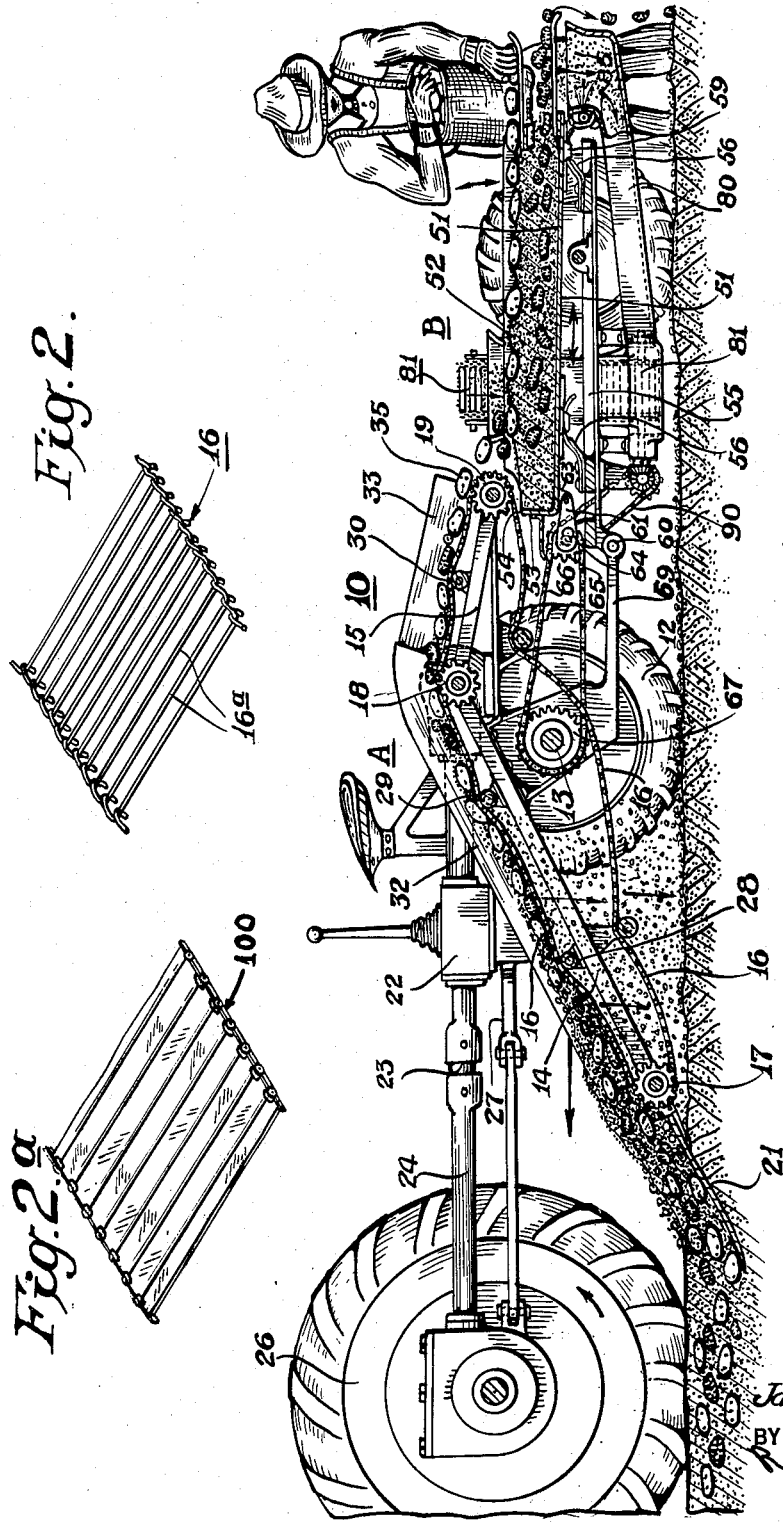
INVENTOR
James S. Hardigg
BY Ralph T. French
ATTORNEY March 16, 1954 J. S. HARDIGG 2,671,999
POTATO DIGGER AND SEPARATOR
Filed July 20, 1951 2 Sheets-Sheet 2
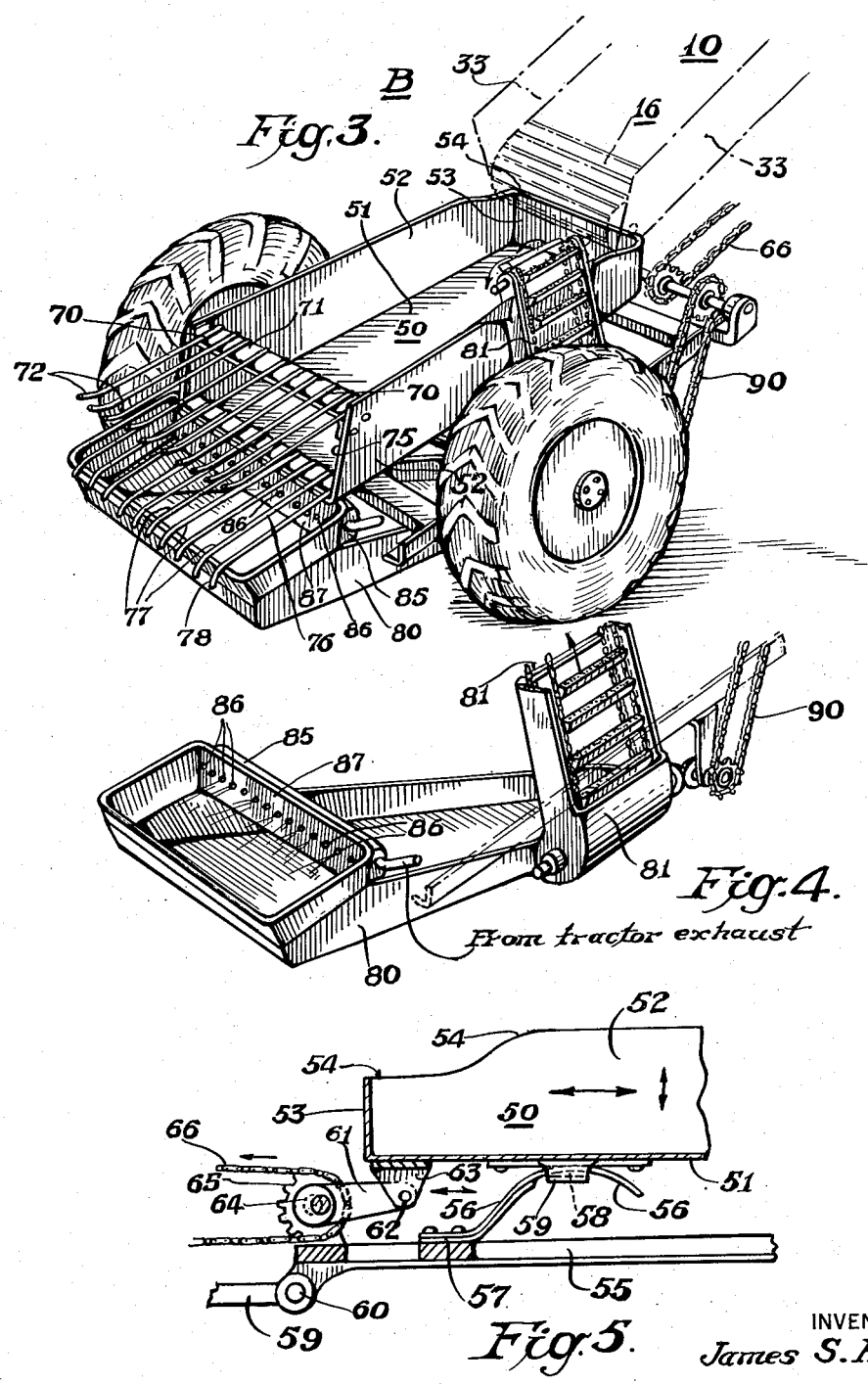
INVENTOR
James S. Hardigg
BY
Robert T. French
ATTORNEY Patented Mar. 16, 1954

2,671,999

UNITED STATES PATENT OFFICE 2,671,999

POTATO DIGGER AND SEPARATOR

James S. Hardigg, Parkersburg, W. Va.

Application July 20, 1951, Serial No. 237,805

2 Claims. (Cl. 55—141)

This invention relates to farm machinery, more particularly to apparatus for harvesting potatoes, and has for an object to provide improved apparatus of this character.

There are farm machines in general use for digging potatoes from the earth and for moving them on an agitated perforated traveling belt to remove any earth clinging thereto and dug up therewith. However, to the best of applicant's knowledge, all such machines dig up stones with equal efficiency, but fail to provide any means of separating the potatoes from the stones. Consequently it is necessary that such machines return the potatoes and stones to the surface of the ground, from whence the potatoes later are manually separated from the stones incident to being placed in barrels for hauling to storage or market.

This hand picking of the potatoes from the surface of the ground, after both potatoes and stones have been dug from the earth, constitutes one of the primary utilizations of manpower in the complete potato farming cycle, from spring plowing and planting to fall harvesting.

This seasonal peak manpower requirement could be reduced to approximately normal year-round requirements if suitable machinery were available to automatically separate the potatoes and stones immediately after they are dug, and it is an object of the present invention to provide such machinery.

Another object of the invention is to provide apparatus for separating potatoes from stones without inflicting damage to the potatoes.

Yet another object of the invention is to provide apparatus adapted for use with conventional potato-digging machinery for receiving therefrom the dug potatoes and stones and separating them.

A further object of the invention is to provide a modification of a conventional potato-digging machine capable of digging potatoes and stones and separating them on the machine.

In an elementary form, the present invention comprises a container for soil or other material having generally similar characteristics and being of a specific gravity intermediate those of potatoes and stones, together with means for agitating the soil in the container so that when a mixture of potatoes and stones is supplied thereto the potatoes will rise to the surface of the soil and the stones will sink below such surface.

Throughout the specifications and claims the term "soil" includes sand, gravel, earth, dirt, and other materials having generally similar characteristics, and any mixture of any such sand, gravel, earth, dirt, or other materials, and is not limited to the soil in which the potatoes are grown.

Another object of the invention is to provide apparatus for continually receiving a mixture of stones, potatoes and the soil in which the potatoes grew, for separating the potatoes in the mixture from the stones, and for discharging the potatoes at one point and the soil and stones at a different point.

These and other objects are effected by the present invention as will be apparent from the following description and claims, taken in accordance with the accompanying drawings forming a part of the application, and in which:

Fig. 1 is a longitudinal sectional view of a potato digging and separating machine constructed in accordance with the present invention;

Fig. 2 is a fragmentary perspective view of a portion of the apparatus of Fig. 1;

Fig. 2a is a view similar to Fig. 2, but showing a modification;

Fig. 3 is a perspective view of the potato-separating portion of the machine of Fig. 1;

Fig. 4 is a perspective view of the soil-returning mechanism of the machine of Fig. 1; and, Fig. 5 is an enlarged fragmentary longitudinal sectional view of a portion of the machine of Fig. 1, showing the mechanism for agitating the separating container.

Referring now to the drawings in greater detail, and particularly Fig. 1 thereof, the reference character 10 indicates, in its entirety, a combined potato digging and separating machine, the digging portion being designated A and the separating portion being designated B.

In the arrangement illustrated in Figs. 1 and 2, the potato digger A is of a construction in general use and hence should require only a brief description here. The digger includes a pair of supporting wheels 12 joined by an axle 13 on which is mounted a frame 14—15. An endless belt 16 running on sprockets 17, 18 and 19, in a clockwise direction as viewed in Fig. 1, functions as an elevator for the potatoes and stones dug up by the shovel 21 carried at the forward end of the frame members 14.

The drive for the elevator belt 16 is provided by the sprocket 18 which is driven through a transmission 22 connected through universal joint 23 with the power takeoff 24 of a tractor 26 which pulls the digger A by means of the tongue 27.

As indicated in Fig. 2, the elevator belt 16 comprises spaced bar-like links 16a permitting soil dug up with the potatoes to fall through to the ground. In order to insure satisfactory separation of the soil from the potatoes, the elevator belt may pass over irregular agitator sprockets 28, 29 and 30.

Side plates 32 and 33 adjacent the edges of the top run of the elevator belt 16 prevent lateral escape of potatoes until they reach the rear discharge edge 35 of the elevator. Heretofore, when such a digger has been used, the potatoes and stones have been allowed to fall from the rear discharge edge 35 to the ground, from whence the potatoes were later gathered manually.

In accordance with the present invention, the potatoes and stones fall from the rear discharge edge 35 of the elevator belt 16 to the separator B where the potatoes are separated from the stones.

As best shown in Figs. 1 and 3, the separator B may comprise a box-like container 50 having a bottom 51, side walls 52 and a front end wall 53, the latter being lower than the side walls 52, as at 54, for a purpose to be hereinafter explained.

The container 50 is supported on a frame 55 for limited vertical and longitudinal motion relative thereto, by resilient straps 56 bolted to the frame 55, as at 57, with their free upper portions slidably received in slots 58 of the retainers 59 (Fig. 5).

Limited oscillatory movement may be imparted to the container relative to the frame 55 by means of the arm 61 pivotally connected, at 62, to a lug 63 depending from the forward end of the container. The opposite end of the arm 61 has an eccentric mounting, at 64, on a sprocket 65, driven through chain 66 and sprocket 67 from the axle 13 of the digger A. Rotation of the sprocket 65 will produce a degree of horizontal oscillation to the container 50, and, due to the design of the resilient supporting straps 56, the container will also have a degree of vertical oscillation.

As shown in Fig. 1, the separator B is drawn by the digger A through the draw bar 69, which is pivotally connected to the separator frame 55, as at 60.

The container 50 is filled with soil 62 of suitable consistency to a level determined by the height of the container front wall 53, which, being lower than the side walls 52, as at 54, determines the maximum level of soil in the container, as any excess will be spilled over the low edge 54 as the container is agitated in the manner previously described.

Preferably the resilient straps 56, which connect the container to the frame, are so designed that the bottom 51 of the container is inclined rearwardly with the result that as the container is agitated, the soil therein, together with the potatoes and stones fed thereto from the discharge edge 35 of the digger A, is gradually fed to the rear of the container.

Inasmuch as the specific gravity of freshly dug potatoes is about 1.1, that of stones is about 2.5, and that of soil intermediate these, agitation of the mixtures of soil, potatoes and stones during its travel through the container results in gravitational separation of the potatoes and stones, the former rising to the surface of the soil and the latter sinking below the soil's surface.

As the soil, with the potatoes on the surface thereof, reaches the rearward end of the container, the potatoes are separated from the soil containing the stones by a grate structure 70 comprising a transverse bar 71 carried by the side walls 52 at their rearward ends and below their upper edges, and a series of teeth 72, carried by, and extending rearwardly from, the transverse bar 71. The rearward movement of the soil and potatoes feeds the latter onto the grate 70; any soil passing above the bar 71 falling through the grate 70 between the teeth 72. Preferably the rearmost terminal portions of the teeth 72 are curved upwardly to retain the potatoes on the grate 70 until they are manually removed by an operator riding or walking beside the grate, or are otherwise collected.

While it is contemplated that various soils will be utilized as the separating medium, it is obvious that some soils may serve this purpose more satisfactorily than others. For example, experimentation has demonstrated that soil of a sandy nature produces highly satisfactory results, and when soil from which the potatoes are dug is of a nature producing somewhat less satisfactory results, some operators may desire to use sandy soil especially obtained for the purpose. In such cases it may be desired to use the same soil repeatedly, and to this end the present invention provides means for separating the stones from the soil and returning the soil to the inlet or front end of the container.

As best shown in Figs. 3 and 4, the container discharge opening for soil and stones, at 75, has a lower grate 76 with teeth 77 whose rearward terminal portions incline downwardly, as at 78, so that the stones may be fed rearwardly and fall to the ground, while the soil falls through the grate, between the teeth 77, and is caught in a forwardly and downwardly inclined trough or chute 80, whose lower forward end communicates with the inlet of a chain-bucket type of elevator 81, whereby the soil is returned continuously from the trough to the inlet end of the container for recirculation therethrough.

Where the soil from which the potatoes are dug is rather wet, repeated use of the same soil in the separator would eventually result in its picking up an excessive amount of moisture from the wet potatoes. In such cases it may be desirable to dry the soil, and for this purpose there is provided a manifold 85 (Fig. 4) adapted to be supplied with heated air or gases, for example from the exhaust of the tractor, or even with unheated air from a blower (not shown). The manifold 85 is arranged to discharge a sheet of air (heated or unheated) through a series of perforations 86 in a wall 87 of the entrance to the trough 80, so that the soil falling therepast from the lower grate 76 may be dried.

In some cases, the soil from which the potatoes are dug will be entirely satisfactory as a separating medium, in which case the digger A may be provided with an elevator belt 100 which is imperforate, as shown in Fig. 2a. When such an imperforate belt is used, the dirt dug up with the potatoes will be continuously fed to the separator container 50; and the lower grate 76, soil return trough 80, and soil elevator 81 may be omitted.

If the machinery already includes these parts, the soil elevator drive chain 90 (Figs. 1, 3 and 4) may be removed, and the soil allowed to run over the upper edge of the soil return trough.

While the invention has been shown in two forms, it will be apparent to those skilled in the art that it is not so limited, but is susceptible

What is claimed is:

1. Apparatus for the separation of potatoes and stones comprising, in combination, a frame, an endless imperforate conveyor supported by said frame, wheels supporting said frame for movement along a potato row, scoop means carried by said frame and operative as the apparatus is advanced along a potato row to direct a mixture of soil, potatoes and stones onto said conveyor, a container at the discharge end of said conveyor having an outlet and adapted to continuously receive potatoes, stones and soil, and means for agitating the mixture of potatoes, stones and soil in said container and for feeding said mixture to the soil container outlet, the agitation of said mixture causing the potatoes to rise to the surface of the soil and the stones to sink below said surface, whereby said potatoes and stones are separated, as the outlet is reached.

2. Potato-harvesting apparatus comprising, in combination, frame structure, wheels supporting said frame structure for movement of the apparatus along a potato row, shovel means carried by said frame structure for scooping up potatoes, stones and soil from a potato row as the apparatus is moved along the latter, a container having an outlet mounted on said frame structure for limited movement relative thereto, imperforate conveyor mechanism for feeding to said container the potatoes, stones and soil scooped up by the said shovel means, means for continuously agitating said container and the mixture of potatoes, stones and soil therein and for moving said mixture through said container to the said outlet thereof, the agitation of said mixture effecting separation of the potatoes and stones due to the potatoes rising to the surface of the soil and the stones sinking below said surface, and rake means for receiving the separated potatoes prior to discharge of the stones and soil through said container outlet.

JAMES S. HARDIGG.

References Cited in the file of this patent

UNITED STATES PATENTS

| Number | Name | Date |
|---|---|---|
| 938,256 | Loufek | Oct. 26, 1909 |
| 2,078,275 | Prins | Apr. 27, 1937 |
| 2,079,059 | Winkleman | May 4, 1937 |
| 2,265,537 | McNeil, Jr. | Dec. 9, 1941 |
| 2,529,023 | Helms | Nov. 7, 1950 |
| 2,535,801 | LaPointe | Dec. 26, 1950 |
| 2,559,965 | Innes | July 10, 1951 |